US012668745B2

(12) United States Patent
Eine et al.

(10) Patent No.: US 12,668,745 B2
(45) Date of Patent: Jun. 30, 2026

(54) FIRE PROTECTION SYSTEM

(71) Applicants:Illarion Eine, Kyiv (UA); Egon Döberl, Grünbach bei Freistadt (AT)

(72) Inventors: Illarion Eine, Kyiv (UA); Egon Döberl, Grünbach bei Freistadt (AT)

( * ) Notice: Subject to any disclaimer, the term of this patent is extended or adjusted under 35 U.S.C. 154(b) by 773 days.

(21) Appl. No.: 18/008,606

(22) PCT Filed: Jun. 9, 2021

(86) PCT No.: PCT/AT2021/060201
§ 371 (c)(1),
(2) Date: Dec. 6, 2022

(87) PCT Pub. No.: WO2021/248173
PCT Pub. Date: Dec. 16, 2021

(65) Prior Publication Data
US 2023/0340332 A1     Oct. 26, 2023

(30) Foreign Application Priority Data
Jun. 10, 2020     (AT) ............................... A 50506/2020

(51) Int. Cl.
*C09K 21/02*          (2006.01)
*A62C 2/06*          (2006.01)
(52) U.S. Cl.
CPC ............... *C09K 21/02* (2013.01); *A62C 2/06* (2013.01)
(58) Field of Classification Search
CPC .. A62C 2/06; A62C 2/065; A62C 2/10; A62C 3/00; A62C 3/02; A62C 3/0257; A62C 8/06; C09K 21/02
See application file for complete search history.

(56) References Cited

U.S. PATENT DOCUMENTS 3,828,856 A  *  8/1974  Wallis ...................... A62C 8/06
                                                          169/50
4,624,320 A  *  11/1986  Romaine .............. A62B 17/003
                                                          252/608
(Continued)

FOREIGN PATENT DOCUMENTS

CN          202328482 U  *  7/2012
CN          203915849 U  *  11/2014
(Continued)

OTHER PUBLICATIONS

International Search Report and Written Opinion in International Application No. PCT/AT2021/060201, mailed Sep. 17, 2021, 14 pages.

*Primary Examiner* — Matthew R Diaz
(74) *Attorney, Agent, or Firm* — Liang & Hennessey LLP; Brian Hennessey

(57)          ABSTRACT
A method of producing a fire protection system is provided that includes dosing a crushed silicon dioxide raw material and a granulated alkali metal hydroxide into a reactor; adding water in the reactor and mixing under self-heating until a hot pre-product is obtained; storing said pre-product until a homogenous, colloidal, aqueous dispersion of the alkali metal hydrosilicate is obtained; and applying the homogenous, colloidal, aqueous dispersion to a substrate. A ready-for-use fire protection system is provided that includes a dispersion of an alkali metal hydrosilicate, a substrate, and a reinforcement, which is present in an air-tight or vacuum packaging. A use of a such fire protection system is also provided.

4 Claims, 1 Drawing Sheet

(56)　　　　　References Cited

U.S. PATENT DOCUMENTS

| | | | | | |
|---|---|---|---|---|---|
| 4,992,310 | A | * | 2/1991 | Gelb | A62C 3/00 |
| | | | | | 229/87.01 |
| 5,672,390 | A | * | 9/1997 | Crews, IV | C09K 21/02 |
| | | | | | 427/325 |
| 5,736,109 | A | * | 4/1998 | Howorth | C04B 26/02 |
| | | | | | 428/323 |
| 5,830,319 | A | * | 11/1998 | Landin | C09K 21/12 |
| | | | | | 428/921 |
| 6,820,382 | B1 | * | 11/2004 | Chambers | E04B 1/948 |
| | | | | | 428/40.1 |
| 9,517,372 | B2 | * | 12/2016 | Ploumis | B32B 5/26 |
| 2007/0275231 | A1 | * | 11/2007 | Meyer | B32B 17/10311 |
| | | | | | 428/323 |
| 2011/0070420 | A1 | * | 3/2011 | Lim | B32B 5/26 |
| | | | | | 442/389 |
| 2018/0100266 | A1 | * | 4/2018 | Cordani | C09K 21/14 |

FOREIGN PATENT DOCUMENTS

| | | | | | |
|---|---|---|---|---|---|
| DE | 4120562 | A1 | * | 12/1992 | A62C 8/06 |
| DE | 4425898 | A1 | * | 3/1995 | B32B 17/02 |
| EP | 1431027 | A1 | | 6/2004 | |
| GB | 2250933 | A | * | 6/1992 | A62C 8/06 |
| GB | 2356584 | A | * | 5/2001 | B29C 63/04 |
| JP | S4816438 | B1 | | 5/1973 | |
| JP | 2010228960 | A | | 10/2010 | |
| JP | 2015101635 | A | | 6/2015 | |
| UA | 3802 | C2 | | 12/1994 | |
| UA | 88233 | C2 | * | 9/2009 | C01B 33/32 |
| WO | 1997033843 | A1 | | 9/1997 | |
| WO | 2000046277 | A2 | | 8/2000 | |
| WO | WO-0046277 | A2 | * | 8/2000 | C09K 21/02 |
| WO | WO-03024682 | A1 | * | 3/2003 | B28B 11/24 |
| WO | WO-2012003593 | A1 | * | 1/2012 | B32B 17/10761 |
| WO | 2009105051 | A1 | | 8/2019 | |

* cited by examiner

FIRE PROTECTION SYSTEM

CROSS-REFERENCE TO RELATED APPLICATIONS

The present application is a national phase application of PCT Application No. PCT/AT2021/060201, filed Jun. 9, 2021 entitled "FIRE PROTECTION SYSTEM", which claims the benefit of Austrian Patent Application No. A50506/2020, filed Jun. 10, 2020, each of which is incorporated by reference in its entirety.

BACKGROUND OF THE INVENTION

1. Field of the Invention

The invention relates to a fire protection system, in particular a ready-for-use fire protection system and the production and use thereof. The invention in particular relates to a fire protection system on the basis of alkali metal hydrosilicates, preferably sodium hydrosilicate, which has preferably been obtained by alkalizing natural siliceous raw material.

2. Description of the Related Art

Fire protection materials and systems should meet the following requirements:
- a. Highest possible specific heat absorption in contact with source of high temperature.
- b. Blowing up in contact with a source of high temperature and/or a flame with a considerable increase in thickness of the barrier which separates the surface of a product or building structure from fire or the respective high temperature.
- c. Blowing up without emitting toxic and/or chemically aggressive gases/substances.
- d. Easy to use and not requiring any special equipment and/or highly qualified staff for application.
- e. Good adhesion to the surface to be protected, such as wood, metal, concrete, etc. No additional agents/substances required for mechanical fixing.
- f. Easy and inexpensive producing; mainly use of natural raw materials.
- g. Suitable for long-time storage with stable chemical composition and stable physical properties. No special conditions (temperature control, induced ventilation, fire extinction, etc.) needed for long-time storage.
- h. Ideally minimized $CO_2$ emission during production, storage, and use.

Meeting those requirements separately or in some combinations is not complicated. There are many materials/systems on the market for the fire protection of building structures, piping, and wiring. Those are usually not universal but have narrow fields of use.

There is a group of materials/systems for the fire protection mainly of steel structures, consisting of lightweight, porous mineral fillers (expanded vermiculite and perlite) and hydraulic mineral binders.

Such fire protection is 'passive', i.e., no processes of blowing up and ablation ensue upon contact with a source of heat/fire.

Application of such materials/systems is done in the form of applying/spraying on a relatively thick layer using special machinery.

The fire rating depends exclusively on the heating-up time of the insulating layer.

The next group of fire protection systems are lightweight, fire-proof plates mainly made of mineral fibers or calcium silicate.

Such systems are also 'passive', labor-intensive in use and require special technical solutions for mechanical fixing and sealing joints/sutures between the plates. A large group of fire protection materials is based on the use of so-called anti-pyrogens, mainly salts containing ammonium and halogen.

Under the influence of high temperatures, thermal decomposition of the anti-pyrogen occurs while large amounts of toxic, chemically aggressive gases are released that hinder the burning process.

There are also 'active' fire protection systems that contain intumescent (swelling) graphite.

Under the influence of high temperatures, such materials blow up to a multiplied thickness of the heat-insulating fire protection barrier.

The blowing-up process of graphite is accompanied by heat absorption, thereby causing the heat-insulating barrier to slowly warm up.

It should be noted that the starting temperatures of the blowing-up reaction of graphite are above 200° C. in various compounds.

Fire protections systems are most effective on the basis of alkali metal hydrosilicates, preferably sodium hydrosilicates.

Gelatinous hydrosilicate materials have been known for such a long time that information about them and the processes of making them are already included in textbooks.

For example, what is called 'waterglass' is known.

Waterglass as a binder is often used in fire protection materials and systems.

It should be noted that compounding materials on the basis of waterglass are unstable and hygroscopic in a moist environment and crack in a dry gaseous environment (cracks in the surface). It is important that water in waterglass serves merely as a dispersion medium which is easy to remove during drying and therefore does not compromise the fire resistance of the compounding material.

The basis of waterglass is solid 'soluble glass', which is obtained by melting silica sand at 1100-1400° C. with sodium carbonate and/or sodium sulfate. While melting, $SiO_2$ is converted from a crystalline into an amorphous state as a silicate block.

Waterglass is obtained by grinding a silicate block and dissolving it in water, mostly using processes of autoclaving. Obviously, the melting and autoclaving processes are energetically disadvantageous. Therefore, waterglass is increasingly prepared from raw materials on the basis of amorphous $SiO_2$. It is autoclaved at a temperature of about 200° C. with caustic alkali solutions while directly producing a colloidal solution of sodium hydrosilicate. Unfortunately, only rare silicas with an amorphous $SiO_2$ content of more than 98% are suitable for such a 'wet' method.

A number of steps for developing simple, economical methods of producing quality hydrosilicate gels out of raw materials with a relatively low content of amorphous $SiO_2$ have already been taken.

Patent UA No. 3802 describes a method of producing a hydrosilicate gel comprising grinding silicas that contain at least 85% amorphous $SiO_2$ into a fine-grained mass and treating said mass with sodium hydroxide solution in a medium of saturated water vapor at a temperature of 80-100° C. for 20-60 minutes.

A product produced according to this method forms a sticky mass and can melt once. When heated over 200° C., it is irreversibly cured.

The specific energy consumption for producing such gel is considerably smaller than for producing waterglass according to the 'wet method'.

On the other hand, sodium hydroxide solution—a concentrated (48%) solution of NaOH—requires special storing measure and, at a storage temperature of 80-100° C.—particularly strict methods of staff protection.

In addition, stickiness and viscosity of the hydrosilicate gel obtained by this method vary greatly.

A method of producing a more stable, hard hydrosilicate gel is known from International Publication WO 97/33843 dated 18 Sep. 1997.

This method comprises:

Crushing silicas that contain at least 70 wt. % amorphous SiO$_2$ to a particle size of 1.0-2.5 mm.

Mixing the above particles with an aqueous solution of caustic alkali.

Steaming the mixture at atmospheric pressure and a temperature of 70-90° C. and mixing until hydrosilicates form.

Cooling the steamed mixture to a temperature of 18-25° C. in a time sufficient for transition into the state of a brittle hydrosilicate gel.

When heating above 100° C., said hard gel becomes malleable, and at temperatures above 200° C., it blows up intensively and is cured irreversibly.

The method described above, however, also requires complicated and expensive systems of storing and transporting the sodium hydroxide solution.

Moreover, the gel of those methods has limited suitability as a binder and in particular as an adhesive.

This drawback is particularly strong when trying to produce mechanically durable fire protection materials to protect building structures in the case of fire.

Further experimental studies have shown that is possible to improve the adhesion and technological properties of solid hydrosilicate gels.

An improved method of producing a hard hydrosilicate gel, which is technically closest to the subject method, is thus known from the International Publication by the same author, WO 00/46277 dated Aug. 10, 2000.

This method is used to obtain a solid gel that contains a mixture of alkali metal hydrosilicates and 30 to 40 wt. % combined water.

At the same time, the mass ratio of 'dispersion water' and 'chemically combined water' is 5:3 to 4:1.

Such gel is a hydrosilicate 'thermoset':

which is suitable for dilution with water after grinding.

which transforms into a viscous, liquid state once when heated briefly in the temperature range of 45-250° C.

which is cured when heated for a longer time at a temperature above 180° C. under elimination of hydrates, temporary expansion while melting the surface layer and final, irreversible expansion.

This hard gel is particularly efficacious as a fire protection material (including in the form of aqueous dispersions of hydrosilicates).

Said efficacy is explained as follows:

Following unloading from the reactor, a hard gel is formed while cooling the viscoelastic pre-product, while water contained in the dispersion is chemically combined in the gel structure as so-called crystal water, or hydration water.

The removal of combined water from a hydrogel requires a considerable amount of heat. This is why the surface temperature of the protected structure remains at about 100° C. for a long time in a case of fire (the longer, i.e., the thicker the layer of fire protection material is).

Unfortunately, this method of producing a hydrosilicate gel has a couple of drawbacks as well. In particular:

Requirement of complex and expensive complex of systems due to the use, and heating, of liquid, caustic leaches.

Only a colloidal, aqueous dispersion obtained by crushing and diluting a hard gel with water is suitable for use as fire protection material. A such colloid is not practical because it only forms a colloidal substance on day two or three after diluting the crushed hard gel with water. Moreover, it is short-lived and can only be used for three to four days. This makes industrial production, transportation, and long-time storage of such colloidal fire protectant impossible.

In addition, a colloidal, aqueous dispersion of hydrosilicate as a fire protectant can only be applied to the protected surface in a layer of no more than 1-1.5 mm. When applying it to a vertical surface in a thicker layer, the colloidal fire protectant will run over the surface. Upon drying, the thickness of the colloidal layer will decrease and form a hard gel film of a strength of 0.5-0.7 mm. The process of drying and gel film formation usually takes 16-20 hours. Regularly, the fire protection of many building structures (in particular those of steel) requires a much higher layer thickness for sufficiently high fire ratings. The results of fire tests on a steel column showed that the gel layer thickness required to achieve fire raring REI 60 must be 4.5 mm. Such a layer, applied in plies, can be applied within 7-8 days, which is completely unpractical and inacceptable in mass production. Moreover, the addition of an armor in the form of short basalt fibers and/or porous fillers to the colloidal substance did not generate the expected effect because applying the fire protectant becomes impossible with an amount of filler that could affect the thickness of the gel layer.

Also, problems arose during the fire tests from the fact that without reinforcement, the gel layer softens, swells, and runs down the protected surface under the influence of its own weight. This effect became stronger with increasing thickness of the gel layer. Achieving a fire rating of over REI 60 was therefore technically impossible.

An energy-efficient method of preparing a hard hydrosilicate gel is described in the patent UA88233 by the same author.

It differs from the previously described method in that it comprises:

crushing silicas with an amorphous SiO2 content of at least 70 wt. %, to obtain so-called silica sand, dosing said sand and an air-dry alkali, loading the same into a reactor with the mixer turned on and mixing under self-heating until a hot, viscous pre-product is obtained, unloading the hot, viscous pre-product into containers, storing said pre-product in containers while slowly, freely cooling them down to ambient temperature until a 'mature', hard hydrosilicate gel is obtained.

The use of dry leaches considerably simplifies the technical complex of the process and substantially reduces the need for external heat sources.

After being crushed and dissolved to the required viscosity with water, such gel can be used as a mineral adhesive for producing practically inflammable compound materials. Moreover, it should be noted that many active fragments of broken polysilicate bonds are present on the surfaces of the particles of the crushed gel, which try to adhere and polymerize into a hard gel monolith.

This effect makes it close to impossible to exactly dose particles of crushed gel and thereby results in an uneven quality of the adhesive obtained.

In addition, such adhesive, as described above, cannot be stored for more than three to four days without any loss in properties.

JP2015101635A describes a dry mixture of metal hydroxide particles and silicon dioxide particles which are admixed to a plastic as flame protectants.

JP2010228960A discloses a method in which alkali metal silicate, metal hydroxide, and a filler are dispersed in water.

JPS4816438B relates to a method of generating alkali silicate.

WO2012003593A1 relates to a transparent heat protection foil for producing heat protection glass.

SUMMARY OF THE INVENTION

Despite the fact that the chemical composition of materials such as alkali metal hydrosilicates cannot be exactly determined, said materials share some characteristics. They can soften when heated and blow up to form an effective fire protection barrier.

The process of softening and blowing up such materials is usually associated with the absorption of a large amount of heat. On this basis, such materials can be used as components of fire protection systems.

It is an object of the invention to provide an effective, long-lived, and user-friendly fire protection system.

This object is achieved with a fire protection system according to the claims.

Another object of the invention is to create a substantially simpler and more economical method of producing an effective, long-lived, and user-friendly fire protection system.

This object is achieved with the method according to the claims.

The proposed method comprises:

dosing a crushed silicon dioxide raw material and a granulated alkali metal hydroxide into a reactor;

adding water in the reactor and mixing under self-heating until a hot pre-product is obtained;

storing said pre-product until a homogenous, colloidal, aqueous dispersion of the alkali metal hydrosilicate is obtained; and applying said homogenous, colloidal, aqueous dispersion to a substrate.

The proposed method preferably comprises:

crushing silicon dioxide raw materials, preferably to a particle size having a specific surface area of the material ranging from 0.05 to 0.5 $m^2$/gram, dosing said raw material and granulated alkali metal hydroxide (preferably air-dry), adding water in the reactor and mixing under self-heating until a hot pre-product is obtained, unloading the hot, viscous pre-product into a container and storing said pre-product in the container or storing it in the reactor until a homogenous, colloidal, aqueous dispersion of the alkali metal hydrosilicate is obtained.

Preferably, the method further comprises:

producing a fire protection system that consists of a colloidal, aqueous dispersion of an alkali metal hydrosilicate, an armor material, and a separating foil, packaging cuts of said fire protection system in vacuum packaging.

The invention achieves the object with the following means:

changes in the raw material ratio, changes in the sequence and conditions of reagent preparation and in the alkalization of silicas, changes in the method of producing a colloidal, aqueous dispersion of alkali metal hydrosilicate.

The main difference is that a more stable, colloidal, aqueous dispersion of alkali metal hydrosilicate is immediately created by the alkalization and watering of silicas.

The dry-weight ratio of silicon dioxide raw material and alkali metal hydroxide preferably ranges from 1:1 to 5:1.

Preferably, the mix, or the hot pre-product, achieves a temperature ranging from 60-100° C. by self-heating.

The silicon dioxide raw material is preferably silica of natural origin. By silica is understood in particular a mineral with a high silicon content. No pyrogenic $SiO_2$ and/or precipitated $SiO_2$ and/or silica sol is used.

The alkali metal hydroxide is preferably sodium hydroxide (NaOH). Preferably, no KOH is added during the production procedure. Particularly preferably, exclusively NaOH is added during the production procedure.

Preferably, exclusively silicon dioxide raw material, in particular silica, and alkali metal hydroxide, in particular sodium hydroxide, and water are added during the production procedure.

All previous methods performed the production of a colloidal, aqueous dispersion of an alkali metal hydrosilicate by crushing and dissolving a hard hydrosilicate gel with water.

An additional difference is that the fire protection system is produced in the form of ready-for-use rolls/cuts comprising a layer of colloidal, aqueous dispersion of an alkali metal hydrosilicate, a reinforcement fabric—preferably burlap or basalt textiles—and a separating foil. In producing such rolls or cuts, the reinforcement fabric is preferably applied onto or into a layer of a colloidal, aqueous dispersion of an alkali metal hydrosilicate, the weight of which is substantially higher than the weight of the reinforcement fabric.

The following addition difference is that the formation of a hard gel of an alkali metal hydrosilicate occurs directly on the surface to be protected only after the fire protection system has been applied, since the complete rolls/sets are packaged in a vacuum packaging that prevents dehydration of the aqueous dispersion of an alkali metal hydrosilicate.

In the inventive production method, preferably, no antifoam like polyol and/or siloxane is used. In the inventive production method, preferably, no ammonium salt is added to reduce viscosity. In the inventive production method, preferably, no glycerol, siloxane, polyol and/or ammonia is added.

The invention also comprises a preferred method of producing a fire protection system, comprising:

crushing a silicon dioxide raw material to a particle size having a specific surface area of the material ranging from 0.05 to 0.5 $m^2$/gram;

dosing said crushed raw material and an air-dry, granulated alkali metal hydroxide in a reactor;

adding water in the reactor and mixing under self-heating until a hot pre-product is obtained, filling the hot pre-product into a container and storing said pre-product in the container until a homogenous, colloidal, aqueous dispersion of the alkali metal hydrosilicate is obtained;

applying said homogenous, colloidal, aqueous dispersion to a substrate.

The homogenous, colloidal, aqueous dispersion is preferably applied to the substrate without pre-drying, and there is preferably no pre-drying of the substrate either, in particular no pre-drying in an oven.

In order to prevent the patent protection from being circumvented by exceeding requirements or adding not necessary steps, the following shall be pointed out:

Silicon dioxide raw material is preferably crushed to a particle size having a specific surface area of the material ranging from 0.05 to 0.5 m²/gram. Further crushing not required for the method of production but not excluded either and therefore encompassed by the subject invention. Finer crushing is typically disadvantageous since it is mostly associated with higher cost.

Use of an already crushed raw material in such a way that the crushing does not take place on the spot is also possible and encompassed by the subject invention.

The granulated alkali metal hydroxide is preferably air-dry. Special storing in a controlled atmosphere or drying or wetting the alkali metal hydroxide prior to insertion into the reactor is not necessary, but feasible and encompassed by the subject invention.

The reaction takes place under self-heating. An inflow or outflow of thermal energy via the reactor is not necessary, but not excluded and thus encompassed by the subject invention.

The pre-product is preferably filled into a container from the reactor. However, using the reactor itself as a container, or running the reaction in a suitable container, seems generally feasible in case of batch production and is encompassed by the subject invention.

Preferably, the homogenous, colloidal, aqueous dispersion is applied to a substrate in the form of a separating foil.

Preferably, a reinforcement is inserted into or placed on the applied homogenous, colloidal, aqueous dispersion.

Preferably, the ratio of the mass of the layer of the homogenous, colloidal, aqueous dispersion of alkali metal hydrosilicate and the mass of the reinforcement material ranges from 10:1 to 2:1.

Preferably, a strip of the fire protection system is rolled into a roll.

Preferably, the fire protection system is packaged airtight or vacuum-packaged as long as the colloidal, aqueous dispersion is liquid. The dispersion is thus present in the packaging in liquid form and cures only after the packaging is opened.

The invention comprises a ready-for-use fire protection system comprising a dispersion of an alkali metal hydrosilicate, a substrate, and a reinforcement, wherein the fire protection system is present in an air-tight or vacuum packaging.

Preferably, the colloidal, aqueous dispersion of alkali metal hydrosilicate has good adhesion to wood, metal, and concrete surfaces in a vacuum-packaged state, preferably for a period of at least one year.

Preferably, the reinforcement is a reinforcement fabric, preferably in the form of burlap and/or basalt textiles. Preferably, the reinforcement fabric can be penetrated by the dispersion. Preferably, the dispersion penetrates between the fibers of the reinforcement fabric.

Preferably, the substrate is a separating foil which is sealed off against the dispersion.

The invention comprises the use of the ready-for-use fire protection system, wherein, after removing the packaging or vacuum packaging, the fire protection system is applied to a surface to be protected and the colloidal, aqueous dispersion of the alkali metal hydrosilicate is subsequently cured.

Preferably, the substrate on which the colloidal, aqueous dispersion of the alkali metal hydrosilicate is present is removed during application to the surface to be protected.

Preferably, the colloidal, aqueous dispersion of the alkali metal hydrosilicate is present on a reinforcement which remains on the surface to be protected.

Preferably, at least one ply of a reinforcement fabric provided with the colloidal, aqueous dispersion is applied to the surface to be protected.

Particularly preferably, at least two plies of a reinforcement fabric provided with the colloidal, aqueous dispersion are applied, on top of each other, to the surface to be protected.

Examples for Executing the Invention

In the following, the inventive subject will be explained in a detailed description of a method of producing the fire protection system and its use for the fire protection of building structures. As opposed to the methods of producing the hydrosilicate gel described above, in producing the fire protection system according to the subject invention, there is no need to correct the moisture of the natural silicas before feeding them back into the reactor.

This is due to the fact that the final water content of the colloidal, aqueous dispersion of an alkali metal hydrosilicate substantially exceeds the water content of the silicas regardless of the degree of moisture of the natural silicas. Additional addition of water in the reactor is always required.

The weight ratio of water and the dry raw materials is preferably between 1:0.5 and 1:2.5.

Preferably, the moisture of the silicas is measured in the raw material silo and the amount of the water fed back to the reactor is adjusted based on said moisture.

Preferably, the process of mixing the raw components does not take place all the way until a hot, viscous pre-product is obtained but only until alkali metal hydrosilicate having a silicate module m=3.0 to 4.5—in particular 3.5 to 4.5—is formed in the mixture.

The mixing is preferably over a period of 0.1 to 0.5 hours.

Formation of the hydrosilicate in the mix is verified by sampling directly from the reactor.

The sample quality can be determined visually by a series of criteria: the specific shine (which is compared to the etalon using special equipment) and the formation speed of the surface film.

After completing the mixing process, the hot, colloidal, aqueous dispersion of an alkali metal hydrosilicate is run into a container, in which a physico-chemical reaction of dispersion water binding takes place for at least 24 hours with increasing viscosity of the mixture.

Preferably, the dispersion is stored for a period of 18 to 36 hours.

The readiness/maturity of the colloidal dispersion can be determined by rheological properties similar to those of butter cream.

In a preferred production of a fire protection system, the complete colloidal dispersion is applied to a separating foil substrate at a layer thickness of preferably 1-3 mm before applying reinforcement textile to the surface of the dispersion. The complete system is preferably rolled up.

Subsequently, the roll is preferably divided into pieces of 1-3 meters that are preferably wound onto carton or plastic sleeves and preferably packaged into a vacuum packaging. In such packaging, the fire protection system can be stored for preferably 3 to 4 years without any loss in properties.

INDUSTRIAL APPLICABILITY

The subject method allows obtaining a universal product with a very broad range of application and high fire protection efficacy.

The range of application of the inventive fire protection system is the fire protection of steel, wood, and concrete structures, air pipes, wiring ducts, etc.

The system can also be used in the production of fire protection doors and gates as well as in partitions of piping and wiring conducts of fire protection walls and ceilings.

The use of fire protection systems according to the subject invention requires no special systems and/or special qualification of staff.

Following unpacking and removing the vacuum packaging, the strips of the fire protection system are simply glued to the surface to be protected.

The separating foil is removed during gluing, wherein the gluing is done by adhesion of the colloidal dispersion of alkali metal hydrosilicate to the surface to be protected.

The subject fire protection system can be wound around the circumference of the surface of linear structures with access from all sides (columns, air pipes, piping, elements of roof framing) like a bandage.

The subject fire protection system can be glued to the surface of flat structures and/or structures with limited access in the form of strips.

Due to the presence of a reinforcement fabric, multiple layers of the fire protection system can be applied in one operation, allowing the required fire resistance of the structure to be achieved with minimal effort.

To produce the fire protection system comprising a colloidal dispersion of an alkali metal hydrosilicate, commercial industrial standard systems can be used. The separating foil and the reinforcement fabric are preferably delivered by rolls. Then, a layer of colloidal dispersion is preferably applied, and the complete system is wound into a roll.

Standard industrial packaging machines are used for the vacuum-packaging of cuts and/or rolls of the fire protection system.

Storage of the complete fire-retardant system is permissible in storehouses without forced ventilation and exhaust air, heating and fire alarm systems as well as automatic fire extinguishing.

During storage, multiple freezing and thawing is possible.

BRIEF DESCRIPTION OF THE DRAWINGS

The figures below illustrate schematically the production and use of a fire protection system of the subject invention.

DETAILED DESCRIPTION

Figure 1:
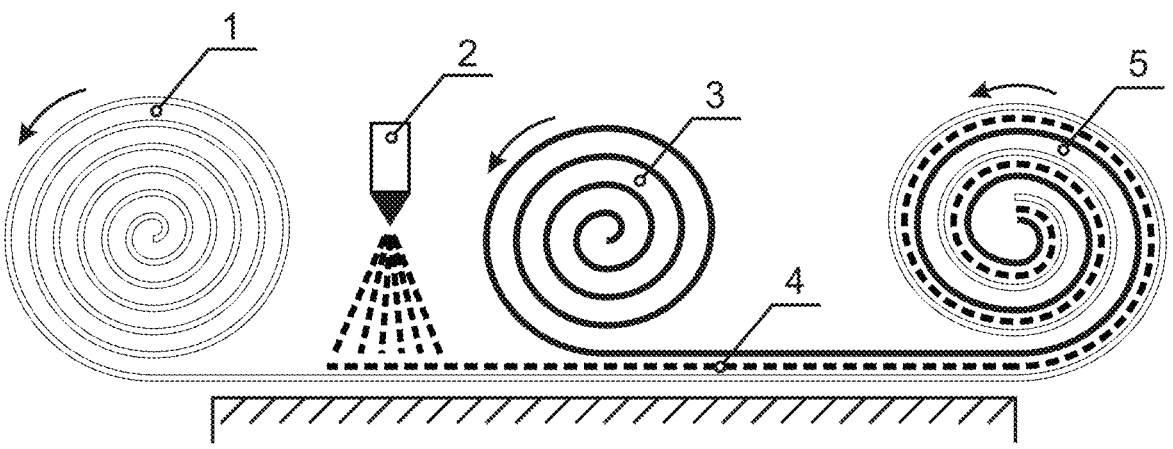
FIG. 1 illustrates the production of a fire protection system according to the subject invention.

FIG. 1 illustrates the production of a fire protection system comprising a substrate 1, preferably in the form of a separating foil, to which substrate 1 a colloidal, aqueous dispersion 4 of an alkali metal hydrosilicate is applied and which has a reinforcement 3.

Preferably, the substrate 1 is wound down from a roll and moved through an applicator 2. The applicator 2 preferably comprises at least one spray can, which is used to apply the dispersion 4. After the dispersion 4 has been applied to the substrate 1, a reinforcement 3 is preferably also wound down from a material roll and applied to, or placed on, the dispersion 4.

Preferably, the fire protection system with the plies substrate 1—dispersion 4—reinforcement 3 is wound into a roll 5. The roll 5 or another packaging unit of the fire protection system is then packaged air-tight, preferably vacuum-packaged.

It is thereby achieved that the dispersion 4 retains the liquid and that drying and curing of the dispersion occur only after the packaging has been opened.

The substrate 1 is preferably flexible. The substrate 1 is preferably a plastic foil. The substrate 1 is preferably sealed off against the dispersion 4 and its liquid components.

The reinforcement 3 is preferably a fabric. Preferably, the dispersion 4 penetrates into the reinforcement 3, in particular between the fibers of a fabric. The dispersion 4 can penetrate the reinforcement 3 completely, i.e., all the way to the opposite surface of the reinforcement.

The colloidal, aqueous dispersion 4 comprising an alkali metal hydrosilicate can be produced according to the method described herein, in particular by executing the steps of:

crushing porous silicon dioxide raw materials to a particle size having a specific surface of the material ranging from 0.05-0.5 m²/gram, dosing said raw material and air-dry granulated alkali metal hydroxide, adding water in the reactor and mixing under self-heating until a hot pre-product is obtained, unloading the hot pre-product into a container and storing said pre-product in the container until a homogenous, colloidal, aqueous dispersion of the alkali metal hydrosilicate is obtained.

The colloidal aqueous dispersion 4 of an alkali metal hydrosilicate thus achieved can be applied to the substrate 1 directly from the said container or be previously refilled and/or stored temporarily.

However, it is not excluded that the dispersion 4 used in FIG. 1, i.e., the dispersion 4 of the alkali metal hydrosilicate of the inventive fire protection system, can be produced in a different, optionally less advantageous manner to be usable for the fire protection system. In other words, the production method for the dispersion 4 is preferably used.

Figure 2:
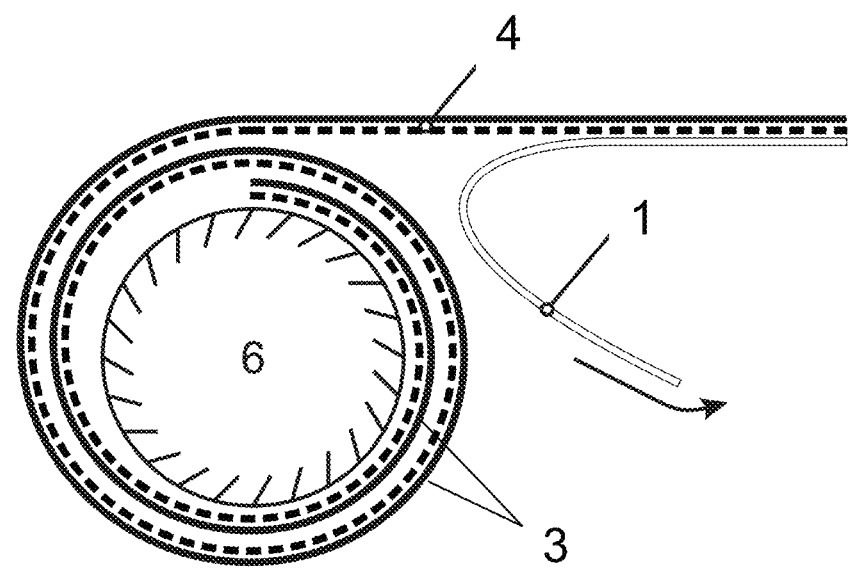
FIG. 2 illustrates the use of a fire protection system according to the subject invention.

FIG. 2 illustrates a use of the fire protection system on an element 6 to be protected, for example, a column. The packaging of the roll 5 created in FIG. 1 or another packaging unit is first removed (not shown).

The substrate 1 is detached from the dispersion 4, and now released dispersion 4 is pressed onto the surface of the element 6, with the reinforcement 3 being on the outside. Under ongoing withdrawal of the substrate 1, dispersion 4 and reinforcement 3 are applied further along the surface. This is preferably done in multiple plies, which may be on an element 6 with access from all sides, such as a column, for example, by wounding around the element 6 in multiple plies.

If the system is applied to a different surface, such as a wall, separated or cut strips of the fire protection system can also be applied on top of each other. Since the reinforcement 3 can preferably be penetrated by the dispersion 4, two plies each of the dispersion 4 that are on top of each other connect through the reinforcement 3 located in between. This results in particularly good adherence of the plies to each other.

Once the packaging, in particular vacuum-packaging, has been removed from the roll 5 or another packaging unit, the dispersion 4 starts curing, leaving sufficient time to apply the fire protection system. The dispersion 4 thus cures after being applied to the surface of the element 6 to be protected.

The invention claimed is:

1. A method for using a ready-for-use fire protection system, the ready-for-use fire protection system comprising:

a colloidal, aqueous dispersion of an alkali metal hydrosilicate;

a substrate; and a reinforcement;

wherein the dispersion is located on the substrate and one of:

the reinforcement is located within the dispersion; and the dispersion is located between the substrate and the reinforcement, and wherein the fire protection system is packaged in one of an air-tight package and a vacuum package, the method comprising:

removing the one of the air-tight package and the vacuum package;

applying, after the removing operation, the fire protection system to a surface to be protected, wherein the substrate on which the dispersion of the alkali metal hydrosilicate is present is removed during application to the surface to be protected; and curing, after the applying operation, the dispersion of the alkali metal hydrosilicate.

2. The method of claim 1, wherein the colloidal, aqueous dispersion of the alkali metal hydrosilicate is present in the reinforcement, which remains on the surface to be protected.

3. The method of claim 1, wherein at least one ply of a reinforcement fabric provided with the colloidal, aqueous dispersion is applied to the surface to be protected.

4. The method of claim 1, wherein at least two plies of a reinforcement fabric provided with the dispersion are applied, on top of each other, to the surface to be protected.

\* \* \* \* \*